United States Patent [19]

Kaplow et al.

[11] 3,769,042

[45] *Oct. 30, 1973

[54] MICROBIAL STABILIZATION OF A COMBINED MEAT, VEGETABLE AND GRAVY FOOD PRODUCT

[75] Inventors: Milton Kaplow, White Plains; Joseph J. Halik, Ossining, both of N.Y.

[73] Assignee: General Foods Corporation, White Plains, N.Y.

[ * ] Notice: The portion of the term of this patent subsequent to Jan. 11, 1989, has been disclaimed.

[22] Filed: May 5, 1971

[21] Appl. No.: 140,617

Related U.S. Application Data

[63] Continuation-in-part of Ser. No. 758,679, Sept. 10, 1968, Pat. No. 3,634,104.

[52] U.S. Cl.................. 426/326, 426/331, 426/342, 426/413
[51] Int. Cl........ A23b 1/01, A23b 1/04, A23b 7/02
[58] Field of Search..................... 99/154, 156, 157, 99/159, 204, 199, 207, 208, 100, 107

[56] References Cited
UNITED STATES PATENTS 2,420,517  5/1947  Brandner............................ 99/204
3,119,691  1/1964  Ludington........................... 99/124
3,202,514  8/1965  Burgen................................ 99/107
3,634,104  1/1972  Kaplow................................ 99/204

*Primary Examiner*—Norman Yudkoff
*Assistant Examiner*—Martin G. Mullen
*Attorney*—Howard J. Newby, Bruno P. Struzzi and Daniel J. Donovan

[57] ABSTRACT

A food product comprised of solid pieces of meat and/or vegetables intimately mixed within a liquid phase gravy or sauce is made microbiologically stable at non-refrigerated storage conditions by immersing the solids phase in an excess of said liquid phase comprising an aqueous solution of stabilizing solutes to infuse a portion of the solutes into the solids phase to the extent of reducing the water activity of the solids phase to a level ranging from about 0.6 to about 0.9 and concurrently forming said surrounding liquid phase gravy to have residual stabilizing solutes such that the water activity of the liquid phase differs from the water activity of the solids phase by less than 0.1.

6 Claims, No Drawings

3,769,042

MICROBIAL STABILIZATION OF A COMBINED MEAT, VEGETABLE AND GRAVY FOOD PRODUCT

CROSS-REFERENCE TO RELATED APPLICATIONS

This application is a continuation-in-part of application Ser. No. 758,679 filed Sept. 10, 1968 now U.S. Pat. No. 3,634,104.

This application incorporates by reference copending applications Ser. No. 684,952 filed Nov. 22, 1967 for Food Process and Product now U.S. Pat. No. 3,595,681 and Ser. No. 93,510 filed Nov. 27, 1970 for Food Process.

SUMMARY OF THE INVENTION

This invention relates to microorganically stable, intimately mixed food products wherein animal or plant materials are intimately combined with an organoleptically compatible liquid, the food product being intended for non-refrigerated storage and for consumption as such or for consumption in a more hydrated form. More specifically, the invention is concerned with the art of stabilizing such products as meat cuts and/or plant material like beef and/or vegetables, potatoes, carrots or peas which are rendered shelf stable for non-refrigerated distribution and yet are compatibly combined with an aqueous liquid having sauce or gravy constituents which impart to the liquid desirable fat and/or thickened flavor and aroma values.

Troop rations should be desirably self-preserving and thus lend themselves to consumption under field conditions. The ration as eaten should be consumable "as is" or should lend itself to consumption simply by warming to a desired degree. While troop rations may be canned by commercial sterilization techniques, it would be desirable to have such a ration packaged more inexpensively, and in any event in a packaging material which is readily openable such as a flexible pouch-forming plastic. The food product should be compact, of light weight and low moisture and yet offer the desired caloric value required to sustain human metabolism. Ideally the product should impart a high practical level of caloric value compatible with organoleptic acceptability. Such a compact product should nevertheless offer identifiable food values such as color and shape representative of the food to be eaten.

It is an object of the present invention to provide a product meeting the foregoing troop ration specifications in a form wherein the food solids, be they animal tissue or plant tissue or mixtures thereof, are flavorfully combined with aqueous liquid preparations identifiable as sauces and/or gravies. The object of the present invention illustratively stated is provision of a foodstuff as a stew in a substantially pathogen-free form which can be packed either anaerobically or aerobically and which can be transported to and in the field of combat without refrigeration. Still another object of the invention is to provide a troop ration which is readily stored and consumed in a variety of field conditions, be they tropical or artic, and which would desirably retain the intended organoleptic food values under such a wide range of combat conditions. A most specific object of the invention is to provide a food ration consisting of food solids and liquids which may be consumed as is in the field even under the most unideal artic conditions and will offer desired chewiness, softness and moistness as consumed, or will at least approach the product target to a greater extent than products of the known art.

Briefly stated the present invention involves infusion of a polyhydric alcohol within a food solid matrix in any one of a variety of degrees of subdivision and the formulation of distinct aqueous liquid also containing a polyhydric alcohol, said food solid and said aqueous liquid having moisture contents usually less than 40 percent respectively and having a total concentration of water soluble compounds respectively whereat the two dissimilar phases are anaerobically or aerobically stable depending upon the packaging techniques intended, it being a further feature of this invention that the respective water activities in the food solids and liquid phases are so related one to another that they equilibrate to one another during storage and retain their microorganic stability.

Thus, in a typical embodiment of the present invention a beef stew is formulated to contain beef chunks and whole or subdivided carrots, peas and potatoes, each of which are respectively dehydrated to a moisture content less than 50 percent and more ideally less than 45 percent through the infusion therein of a stabilizing solute containing a polyhydric alcohol such as glycerol; a "gravy" is formulated as an aqueous liquid containing a suitably emulsified fat and thickening colloid together with flavorants, colorings, spices and the like — which gravy is also of a moisture content less than 45 percent but has, as plasticizing solute therein, a significant level of polyhydric alcohols like glycerol serving to provide a flowable plastic or at least semi-plastic fluidity under the anticipated conditions of use be they of ambient temperate climates or artic conditions. The respective water activities of the dehydrated food solids phase and the liquid phase will be such that migration of aqueous fluids from one phase to the other will not result in a substantial change in the relative concentration of stabilizing solutes in the respective phases and commonly the level of soluble solids and moisture present in the solid phase and the liquid phase will substantially approximate one another such that any moisture migration that may occur incident to storage of the packaged foodstuff will be minimal and in any event will not adversely imbalance the concentration of stabilizing solutes in the food solid phase and the liquid phase.

DETAILED DESCRIPTION OF THE INVENTION

Generally the food solid phase will be "dehydrated" as that term is to be understood herein to a moisture level in the range between 20 and 45 percent whereat maximum organoleptic acceptability and food solid plasticity are provided, it being understood that the term dehydrated in the present instance applies to the comparative moisture level of the food solid relative to its hydrated condition in either the pristine or cooked state. Thus, it is within the ambit of the present invention that raw plant tissue or animal tissue may be dehydrated from a moisture content in excess of 60 percent to a moisture level of 20 to 50 percent whereat acceptable chewiness and food plasticity are provided or the food solid may have been previously dehydrated to below 20 percent moisture but will be rehydrated to this stated range and as rehydrated will similarly provide the desired eating qualities intended, the latter rehydrated condition being comparatively one of dehydration vis a vis the "raw" or "cooked" condition of the food solid as it is normally available or prepared.

To explain further, vegetables such as carrots or peas in the raw form may be blanched and further cooked and eventually dehydrated from a moisture level of say in excess of 75 percent to a moisture level well below 50 percent by infusion of such produce with a stabilizing solution containing a high level of glycerol and other stabilizing solutes whereby the major portion of the food moisture present will undergo transfer from the food solid phase to the stabilizing solution in exchange for stabilizing solutes contained in said solution; this technique will preferably call for procedures more fully set forth in copending application Ser. No. 93,510 filed Nov. 27, 1970 by Milton Kaplow and Joseph Halik entitled Food Process; in accordance with the teachings of that application foodstuffs having a moisture content in excess of 50 percent are stabilized by immersing them in a cooking solution containing at least 5 percent polyhydric alcohol and preferably high in concentration of other stabilizing solutes selected from the class consisting of sugars, salts and mixtures thereof. The food is preferably treated in this solution for a sufficient period of time to at least thermally deactivate any latent enzymatic and pathogenic activity. The solution is used in an excess amount sufficient to permit immersion cooking of the foodstuff and cause it to undergo a water substitution by the stabilizing solution; in this manner the stabilizing solute, including the polyhydric alcohol, replaces a substantial and usually a major percent of the original moisture content of the food.

As an alternative process of "dehydration" in accordance with the precepts of the present invention, food solids are converted to a semi-moist stabilized condition typically from a freeze dried state and are adjusted upwardly to a moisture content in excess of 20 percent by infusing the produce with an aqueous stabilizing solution containing a polyhydric alcohol whereby the moisture level of the produce has ultimately a moisture content between 20 and 50 percent and is caused to contain a level of polyhydric alcohol generally in excess of 5 percent of the weight of total water soluble solids present in the produce; this "dehydrated" condition in the ultimately stabilized foodstuff is understood to appertain by reason of the comparative moisture content of the foodstuff vis a vis that moisture content which is possessed in its pristine or cooked condition which generally is in excess of 60 percent and commonly is in excess of 70 percent. Foods "dehydrated" in accordance with this latter technique are treated commonly in accordance with the teaching set forth in copending application Ser. No. 684,952 filed Nov. 22, 1967 by Milton Kaplow and Joseph Halik entitled Food Process and Product. In general, foods in a substantially desiccated condition, e.g., ones having a moisture content less than 20 percent and commonly less than 10 percent, are caused to be infused by a high concentration of solutes in solution which solutes preferably and ideally contain a plasticizing polyhydric alcohol such as glycerol in the amount stated herein, whereby the foodstuff in an at least pasteurized and preferably fully cooked state is uniformly infused so that the animal tissue or vegetable tissue, typically beef or carrots and peas as illustrated hereinabove, have their morphology uniformly infused with a high concentration of stabilizing solutes sufficient to increase the osmotic pressure of the aqueous solution created therein.

For purposes of the present specification, the teachings of the aforesaid Kaplow, et al. applications identified are incorporated by reference herein and are to be fully considered as having been adopted by applicants herein as part of the teachings of their invention, it being understood, however, that the concentration of stabilizing solutes in all instances must be so rectified as to be in proximate water activity balance with the stabilized aqueous liquids surrounding the foodstuff as will be described hereinafter.

The aqueous liquid, be it a gravy or sauce, depending upon the condiments added thereto and the flavor intended, will commonly have a significant level of fat and thickening colloids such as starch, dextrins or flour together with seasonings, coloring, spices and the like and will be formulated to be in an essentially flowable liquid state under ambient conditions, under temperate climes and where artic conditions are contemplated. Said aqueous phase will also be essentially plastic and to a large extent flowable or spoonable under such environments. To formulate such a stable, aqueous liquid, a significant level of polyhydric alcohol, typical of which will be glycerol, as well as salt and/or sugar compatible with flavor will be placed in solutions in the aqueous media which will generally range in moisture content from 20 to 40 percent content and be less than 45 percent by weight of the total sauce or gravy in the composite of liquid and solids as packed in ration form.

Water activity of the respective food solids and liquid phases described herein will be predetermined in order that the phases will provide requisite bacteriostatic and overall microorganic stability under the anticipated conditions of treatment preparatory to packaging, during packaging and during storage. Such stability determination will be made by formulating the respective solid and liquid phases so as to provide a desired $A_w$, i.e., the relative humidity of a headspace atmosphere in equilibrium with the food or liquid, $A_w$ being customarily expressed as a decimal fraction of one and being so expressed herein and said atmosphere being understood to be that sensed by a hygrometer in a substantially hermetically sealed chamber. Thus, the $A_w$ can be determined by inserting the specimen in an air-tight jar and after storage for a suitable period of 24 hours to assure equilibrium, the relative humidity of the air or head space in the jar will be measured using a hygrometer.

The effect of water activity on the microbiologically stability of food is comprehensively discussed in Scott, W. J., "Water Relations of Food Spoilage Microorganisms" — Advances in Food Research 7 83-127 (1957). Briefly, as is well-known in the art, pure water has an activity of 1.0 and the water activity of bacteriologically stabilized foods are less than 0.9 of that of pure water. The water activity is, in effect, a dimensionless number equal to the ratio of the vapor pressure of water above the food to the vapor pressure of pure water both taken at the same temperature.

For most applications contemplated herein, the respective solid and liquid phases will both have $A_w$'s of 0.60 to 0.90, the specific $A_w$ of use being dependent on the nature of the food and liquid phase primarily. Generally, it will be preferred to formulate such phases at an $A_w$ above 0.75 inasmuch as most foods are more flavorful and organoleptically acceptable at the higher $A_w$. On the other hand, as one approaches the upper part of the range, it becomes more difficult to consistently preserve the particular solid and liquid phases, and so most products will cautiously have an $A_w$ less than about 0.85. The $A_w$'s to which the respective solid and liquid phases are adjusted during formulation and infusion prior to packaging will be such that upon packaging any equilibration that may take place between the respective phases due to imbalance of $A_w$ will not detract from organoleptic acceptability and stability. In most food applications in accordance with this invention, it has been found that the food solid phase and the liquid phase can be formulated prior to packaging at an $A_w$ wherein the respective phases substantially approximate one another or, in any event, do not deviate from one another by more than 0.10 and more commonly by no more than 0.05. On the other hand, the invention is not to be restricted to such a practice inasmuch as some food applications may involve the formulation of food solid and liquid phases having a wider deviation of $A_w$ and which readjust with one another to the desired range. The most preferred range of $A_w$ for the respective food phases as packaged upon achieving such equilibration will be 0.80 to 0.85 with care being exercised at the upper water activity factor against possible instability.

The solid and liquid phases can be separately infused and formulated to achieve the desired pasteurization or sterilization as well as $A_w$ rectification by solute infusion, and the invention can also be practiced by effecting rectification of both the solid and liquid phases in the presence of one another. For some applications the food solid will have the desired stabilizing solutes infused therein by immersion so as to cause dehydration from the raw state to less than 50 percent by transfer with the infusing solution. Collateral to this stabilization the liquid to be admixed with this food solid will be formulated separately and caused to have the desired level of stabilizing solutes also in the aforestated reduced moisture range. Importantly, it is also within the ambit of this invention to employ the infusing solution as the liquid phase such as by rectification of the solids and moisture content of the infusing solution after it has been employed to cause "dehydration" of the food solid.

Briefly, the essence of applicants' invention is the discovery that meat particles in the form of cuts or chunks, and vegetable pieces, can be microorganically stabilized by infusion with solutes by immersion in a measured excess of an aqueous stabilizing solution and the excess of spent infusion solution can be retained after infusing the solids phase (pieces of meat and/or vegetables) to form a stabilized gravy or sauce mixed with and surrounding the solids phase provided the water activity of the infused solids phase is substantially the same as that of the resultant excess infusion solution (sauce or gravy) and both water activities are within the range of 0.6 to 0.9.

Surprisingly, it has been found that if the water activities of the solids phase and liquid phase are substantially in equilibrium, there will be no adverse imbalance of stabilizing solutes during storage and the mixture, as a whole, will remain stable. Thus, it is possible to have any reasonable proportion of gravy with relation to amount of solids without the danger of excessive moisture transfer from the gravy to solids phase and the solids phase, therefore, will retain its desirable texture and will not become unduly soggy or mushy — in effect, both microorganic stability and physical stability are realized in both physical phases of the food product.

Essentially, the complex food product embodiments of this invention are unique, novel and unobvious by virtue of the discovery that the two phases will retain different total water contents when combined and will retain their respective textures brought about by their individual moisture levels if the water activities of the solids phase and the liquid phase are in substantial equilibrium, i.e., the solid food pieces retain their original turgor and do not become mushy and the gravy or sauce retains its original fluidity.

Thus, shelf-stable stews and casserole products can be made by the method of the invention in a one-step process whereby the infusing solution for the particulate meat and vegetable pieces is so formulated that it becomes the gravy or sauce for the stew or casserole at the conclusion of the infusing process, and the total mixture of particulates and gravy or sauce then constitute the completed intermediate moisture product without further treatment.

The invention will be found to be applicable to the formulation of such products as beef, lamb and meat and vegetable stews generally as well as casserole preparations having meat and/or fish in admixture with vegetables and grains such as rice and/or pasta foods such as noodles, macaroni in various shapes. The liquid phase will be so formulated as to provide the resultant gravy or sauce with the desired rheological characteristics compatible with food acceptability. In most applications, the gravy or sauce will be fluid but comparatively plastic or thickened in character. The liquid phase will, thus, be formulated to contain fat and/or colloids such as starches, dextrins, flour, as well as the condiments or spices and the water.

Customarily, it will be found practical to pasteurize the food solids phase by infusion at an elevated temperature, say in excess of 160°F., the pasteurization being carried out sufficiently to at least kill any pathogens or inacivate enzyme; a common range of immersion heating temperatures will be 180° to 210°F. for 15 to 25 minutes depending upon desired product texture of the food solids phase.

As distinguished from canned stew and like preparations of the prior art, the compositions of the present invention are intended to be packaged without commercial sterilization and advantageously may be cooled to sub-pasteurization temperatures prior to packaging, say to temperatures below 180°F., thereby allowing greater manufacturing flexibility and a less expensive substantially non-hermetic package. On the other hand, it is not intended to foreclose the practice of hermetic packaging. Likewise, the invention may be practiced to advantage by use of hermetic anaerobic packaging, the food solid and liquid phases being at sub-pasteurization temperatures and the composition being thereby preserved in an oxygen-free atmosphere whereby rancidity, color changes and light decomposition are avoided, or at least reduced. In all of the foregoing packaging applications, by virtue of the built-in microbial stability, leaks, pinholes or minor imperfections in packaging material, such as may be caused in handling, will not give rise to spoilage. The ration, of course, will be of lighter weight, not only due to the concentration of the foods per se, but also due to use of lighter packaging materials such as polyethylene coated foil and the like, which packaging materials are also flexible and lend themselves to a wider variety of shapes and sizes depending upon ration packaging requirements.

The invention will now be more fully described by reference to the accompanying operative example.

EXAMPLE

A room temperature shelf stable Intermediate Moisture Beef Stew with gravy was prepared by the method of the invention by formulating the solids phase from the following individual constituents:

PARTICULATES — SOLIDS PHASE (BEFORE INFUSION)

| INGREDIENT [1] | AMOUNT (Grams) |
|---|---|
| Lean Chuck Beef | 150 |
| Potatoes | 200 |
| Carrots | 75 |
| Peas | 75 |
| TOTAL | 500 grams |

[1] Subdivided into bite-size pieces.

The liquid phase was formulated as follows:

LIQUID PHASE (BEFORE INFUSION)

| INGREDIENT | AMOUNT (Grams) |
|---|---|
| Glycerol | 150 |
| Beef Soup Base [1] | 50 |
| Salt | 20 |
| Sugar | 37.5 |
| Potassium Sorbate | 2.2 |
| TOTAL | 259.7 |

[1] A blend of Salt (37%); Vegetable Protein (24.5%); Cottonseed Oil (13%); Sugar (11%) and about 15 percent of suitable beef flavoring and coloring ingredients.

The liquid phase ingredients were thoroughly blended together to form the infusing solution for the particulates. The particulates of meat and vegetables were then added to the liquid phase and the mixture was simmered in a double boiler cooking vessel for 30 minutes to cook and infuse the particulates.

Upon cooling, the mixture was determined to comprise a stew and gravy of constituents as follows:

BEEF STEW WITH GRAVY (PARTICULATES INFUSED WITH STABILIZING SOLUTES)

| Ingredient | Amount (Grams) | Weight Present | Moisture |
|---|---|---|---|
| Lean Chuck Beef | 104 | 15.4 | 40.0 |
| Potatoes | 231 | 34.2 | 40.0 |
| Carrots | 61 | 9.0 | 44.0 |
| Peas | 61 | 9.0 | 35.0 |
| Gravy | 220 | 32.4 | 49.0 |
| Totals: | 677 | 100.0 | |

The finished beef stew with gravy product was determined to have an $A_w$ of 0.81 — a value indicative of room temperature shelf stability and resistance to microbiological spoilage.

The stew with gravy is a spoonable plastic aggregation which can be stored as such under ambient room temperatures preparatory to packaging or may be packaged directly from the mixer using aerobic, sub-pasteurization temperatures. Preferably, the stew with gravy will be cold packed in a flexible pouch and heatsealed in a gaseous nitrogen atmosphere. These package preparations offer a microbial stability for all of the anticipated ration requirements therefor.

This, and similar products, such as lamb stew, chicken a la king, etc., can be formulated to be eaten as is or with additional water. The preparations can be eaten cold as well as warm. The products can be eaten under a range of storage temperatures and will be admirably suited to consumption under Arctic conditions as well as temperate climes. The compositions essentially withstand storage with no significant changes in their organoleptic values such as sauce or gravy stability or color or flavor changes in the food solids.

While the invention has been described by reference to an illustrative example, it will be understood that it is applicable for the preparation of other types of similar stews to suit various tastes, appearances and overall organoleptic preferences. For example, a pet food such as a dog-food meat and meat by-products with gravy can be prepared by the method of the invention and similarly, a food designed particularly for cats can be prepared by substituting liver or fish particulates for the meat and omitting the vegetables plus tailoring the liquid phase to have a slightly higher acidity and incorporating flavor appealing to felines.

Generally, the ratio of sauce or gravy liquid phase to the food solid phase will be in the neighborhood of equal weights, with the ratio of the respective phases one to the other varying in weight percent between a range of 0–25 percent from an equal weight relationship. Thus, the liquid phase may be anywhere from 25 – 150 percent by weight of the total admixture of food solids phase.

It will be understood that the stabilizing solutes of use for both the food solids phase and the liquid phase will preferably contain such polyhydric alcohols as glycerol, sorbitol or mannitol or mixtures thereof, glycerol being the most preferred. Propylene glycol may also be employed as a polyhydric alcohol, although its use level should be reduced below 2 percent. The term "polyhydric alcohol" is to be understood as co-extensive with that term as employed in the aforesaid pending Kaplow, et al. application Ser. No. 93,510 as set forth on pages 6, 7 and 8 thereof. The terms "sugar" and "salt" will also be understood to be co-extensive with the illustrations for those compounds listed on pags 12 and 13 of said latter Kaplow, et al. application.

Reference should be had to the appended claims for a definition of the scope of the invention.

What is claimed and desired to be secured by Letters Patent is:

1. A process for imparting microorganic stability to a spoonable intimately mixed food product, such as a beef stew, intended for non-refrigerated storage consisting essentially of a solids phase selected from the group consisting of meat pieces, vegetables and mixtures thereof combined with an aqueous liquid phase selected from the group consisting of gravy and sauce which consists of:

a. formulating a gravy liquid phase consisting of an aqueous mixture of fat, food flavoring and a colloid selected from the group consisting of starch, dextrin, flour, and mixtures thereof and a microorganically stabilizing solute selected from the group consisting of sugars, salts, glycerol, propylene glycol, sorbital and mixtures thereof;

b. immersing the solids phase in an excess of the gravy liquid phase of (a) to infuse a portion of the microorganically stabilizing solute into the solids phase to the extent of reducing the water activity of the solids phase to a level ranging from about 0.6 to about 0.9 by displacing moisture from the solids phase and transferring it to the gravy liquid phase in exchange for the infused stabilizing solutes, said infused solids phase having a moisture content ranging from about 20 to about 45 percent by weight;

c. surrounding the solids phase externally with the remainder of the aqueously diluted non-infused gravy liquid phase, said remainder of non-infused gravy liquid phase having a moisture content ranging from about 20 to about 50 percent by weight and a water activity which differs from the water activity of said infused solids phase by less than 0.1;

d. packaging said solids phase combined and mixed with said resultant gravy liquid phase in a substantially moisture impermeable container whereby moisture migration between said phases is minimal.

2. The process of claim 1 wherein the aqueous liquid phase is a sauce liquid phase.

3. A process according to claim 1 wherein the liquid phase is formulated to contain a fat.

4. The process according to claim 1 wherein the food product contains an antimycotic agent.

5. The process according to claim 1 wherein the antimycotic agent is potassium sorbate.

6. The process according to claim 1 wherein the solids phase has an $A_w$ ranging from about 0.75 to about 0.85 and the $A_w$ of the liquid phase differs in value from the $A_w$ of the solid phase by less than 0.05.

* * * * *